US006738890B2

(12) United States Patent
Ishikawa et al.

(10) Patent No.: US 6,738,890 B2
(45) Date of Patent: May 18, 2004

(54) DATA PROCESSOR

(75) Inventors: Makoto Ishikawa, Kokubunji (JP);
Fumio Arakawa, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 201 days.

(21) Appl. No.: 10/145,761

(22) Filed: May 16, 2002

(65) Prior Publication Data
US 2003/0028749 A1 Feb. 6, 2003

(30) Foreign Application Priority Data
Jul. 30, 2001 (JP) ........................... 2001-229043

(51) Int. Cl.[7] ............................................. G06F 12/00
(52) U.S. Cl. ............................................ 711/220; 711/5
(58) Field of Search ....................... 711/200–220, 5–6

(56) References Cited

U.S. PATENT DOCUMENTS

| | | | | |
|---|---|---|---|---|
| 5,860,151 A | * | 1/1999 | Austin et al. | 711/213 |
| 5,953,748 A | * | 9/1999 | Riordan | 711/207 |
| 5,963,977 A | * | 10/1999 | Gold et al. | 711/156 |
| 6,009,510 A | * | 12/1999 | Henry et al. | 712/204 |
| 6,430,668 B2 | * | 8/2002 | Belgard | 711/202 |

FOREIGN PATENT DOCUMENTS

| | | |
|---|---|---|
| JP | 4-76648 | 7/1990 |
| JP | 8-63974 | 7/1995 |

\* cited by examiner

*Primary Examiner*—Nasser Moazzami
(74) *Attorney, Agent, or Firm*—Reed Smith LLP; Stanley P. Fisher, Esq.; Juan Carlos A. Marquez, Esq.

(57) ABSTRACT

In a memory access process, by identifying the types of memories that can be activated without reducing operating speed and by reducing power consumption, a data processor capable of operating at a high memory-accessing speed is provided. Because memory types can often be differentiated based only on partial bits of the address obtained by addition, a partial bit adder and decision logic are used to make this differentiation at high speed. Because the partial addition preferably does not take into account the possible carry from the lower bits, two types of memories are chosen from memories and are both operated in case the carry should be "1" and in case it should be "0." The result is chosen by a multiplexor and is output. A determination of the entry address of the memory may be similarly carried out by dividing the memory into odd and even entry number banks and utilizing a partial bit adder. Then, both banks may be activated with the results of the partial bit adder as entries, and one of the results is chosen for output.

20 Claims, 10 Drawing Sheets

FIG. 8

| A[12] | B[12] | Cin[12] | Z[12] | Cout[12] | EVEN ENTRY | ODD ENTRY | BANK SELECT |
|---|---|---|---|---|---|---|---|
| 0 | 0 | 0 | 0 | 0 | A[16:13]+B[16:13] | | EVEN |
| 0 | 0 | 1 | 1 | 0 | | A[16:13]+B[16:13] | ODD |
| 0 | 1 | 0 | 1 | 0 | | A[16:13]+B[16:13] | ODD |
| 0 | 1 | 1 | 0 | 1 | A[16:13]+B[16:13]+1 | | EVEN |
| 1 | 0 | 0 | 1 | 0 | | A[16:13]+B[16:13] | ODD |
| 1 | 0 | 1 | 0 | 1 | A[16:13]+B[16:13]+1 | | EVEN |
| 1 | 1 | 0 | 0 | 1 | A[16:13]+B[16:13]+1 | | EVEN |
| 1 | 1 | 1 | 1 | 1 | | A[16:13]+B[16:13]+1 | ODD |

FIG. 9

| A[12] | B[12] | Cin | EVEN ENTRY | Cin | ODD ENTRY |
|---|---|---|---|---|---|
| 0 | 0 | 0 | A[16:13]+B[16:13] | 0 | A[16:13]+B[16:13] |
| 0 | 1 | 1 | A[16:13]+B[16:13]+1 | 0 | A[16:13]+B[16:13] |
| 1 | 0 | 1 | A[16:13]+B[16:13]+1 | 0 | A[16:13]+B[16:13] |
| 1 | 1 | 1 | A[16:13]+B[16:13]+1 | 1 | A[16:13]+B[16:13]+1 |

DATA PROCESSOR

CLAIM OF PRIORITY

This application claims priority to Japanese Patent Application No. 2001-229043 filed on Jul. 30, 2001.

BACKGROUND OF THE INVENTION

1. Field of the Invention

The present invention relates to a data processor such as a microprocessor, and more specifically, the present invention relates to an information processor capable of improved memory access speed and reduced operating power consumption.

2. Description of the Background

One of the main operations of processors is to gain access to a memory designated by an address and to read data of the memory. These functions encompass a significant factor in determining the performance of a processor. In general, the sum of values of two registers in a processor is used as the memory access address. The values obtained by accessing the memory are then stored in the registers, and the "registered values" (i.e., the values of the data in the registers) are used to calculate an address for the next memory access. Accordingly, the ability to repeat these functions: addition; access; and registration, is a main factor in the performance of the processor. Because the route from an accessed memory to the registers can be concealed by controlling a bypass from the accessed memory to the adder, the processing speed of the repetition of addition to calculate an address and access to a memory determines the performance of the processor.

Many of the recent processors are provided with a cache memory or a translation lookaside buffer (TLB) to raise the memory-accessing speed. A cache memory is a high-speed memory used to store part of the data in the main memory. The TLB is a high-speed memory used to store part of the data for address translation and memory protection information. In either case, the memory-accessing operation is governed by addresses generated by the operation of the addition mentioned above.

Some processors, which require high-performance memories, are provided with various memories such as memories for users' free use and memories specializing in the processing of digital signals in addition to cache memories and TLBs. These memories are arranged in an address space in each processor. A program gains access to a memory by means of an address indicating the specific space of a type of memory. In other words, the given address determines to which memory access should be made. In some high-speed processors, all of the types of memories are activated immediately after the addition for a memory-designating address, without waiting for the identification of the type of the memory in question, and data is thereafter read from only one relevant memory.

Japanese Patent Laid-open JP-A-76648/1992 discloses a method for quickly accessing a cache memory when the sum of values of two registers is used as a memory address. This method takes advantage of the fact that an entry address of a cache memory is determined by adding partial bits of the calculated address, and the method provides for access to such a memory by reading two successive entries, without waiting for the carry from addition of the lower bits, but by assuming the two cases in which the carry is "0" and "1."

There are at least two main problems with these conventional methods. The first problem is electric power consumption. If all the memories of a processor with various types of memories are operated to increase the accessing speed, excess power is consumed. A requirement for a reduction in the power consumption of processors for battery-driven mobile equipment in particular has been increasing. Likewise, desktop equipment requires the reduction in the quantity of heat generated by the LSI as clock frequencies of processors increase. The power consumption can be reduced by determining the relevant memory type after calculating the memory-designating address, but this approach does not meet the requirement for high memory access speed.

The second problem is involved in the approach of JP-A-76648/1992. This approach raises the memory-accessing speed but cannot flexibly be applied to TLBs. To avoid a conflict of TLB entries under a plurality of processes, the results of addition are often hash processed by an address space identifier (ASID) and then used as entry addresses. An Exclusive OR (XOR) for each bit is often used in hash processing. In this case, two entry addresses do not necessarily turn out to be successive. A specific example will be described below, assuming that the entry addresses of a TLB are five bits long, an entry address obtained by addition is "00001", and appointed ASIDs are "00000" and "00001."

|  | ASID | |
| --- | --- | --- |
|  | 00000 | 00001 |
| Entry addresses (without carry) | 00001 | 00000 |
| Entry addresses (with carry) | 00010 | 00011 |

It is assumed in the conventional method disclosed in JP-A-76648/1992 that the entry address without carry and the entry address with carry turn out to be successive; therefore, this approach cannot be applied to the TLB of which the above entry addresses are hash processed. Additionally, it is suggested in the drawings of JP-A-76648/1992 to read out two pieces of data from a single memory mat. Accordingly, it is necessary to use a dual-port-type memory with a specialized address decoder. The area of the memory, therefore, increases, and the "specialty" nature of the memory confines its application to a relatively narrow range of products.

SUMMARY OF THE INVENTION

In at least one embodiment, the present invention preferably provides a data processor capable of operating with reduced power consumption level compared to convention processors without reducing its memory-accessing speed. The present invention may also provide a technology for increased access speed to memories which is applicable to TLBs.

In at least one embodiment, the invention provides a data processor comprising: (i) an adder which adds a base address and an offset; (ii) "N" memories (wherein N is a natural number) whose entry address is constituted by partial bits of the resultant address of said addition by the adder; (iii) a partial bit adder which adds partial bits of the base address and partial bits of the offset corresponding to said partial bits of the base address; (iv) a decision logic circuit connected to the partial bits adder that selects and activates no more than "N−1" memories; and (v) a multiplexor which selects one of the outputs of the activated memories.

The data processor preferably takes advantage of the fact that the different types of memories can be distinguished based only on partial bits of an address obtained by a base address and an offset. The data processor has, in addition to an adder for memory addresses, a partial bit adder to calculate partial bits of the address to distinguish between the different types of memories. Because the partial addition does not take into account the possible carry from the lower bits, two types of memories (at most) are both operated in case the carry should be "1" and in case it should be "0." Because the partial bit adder operates at a high speed, the decision logic circuit can preferably identify two relevant types among many types of memories on the LSI before the adder generates a memory address.

According to another embodiment of the present invention, there is provided a data processor comprising: (i) a first partial bit adder which adds a part of a base address, a part of an offset, and the logical sum of said part of the base address and said part of the offset; (ii) a second partial bit adder which adds a part of a base address, a part of an offset, and the logical product of said part of the base address and said part of the offset; (iii) a first memory bank which is connected to the first partial bit adder; (iv) a second memory bank which is connected to the second partial bit adder; and (v) a multiplexor which is connected to the first and second memory banks and which selects data from the first memory bank or data from the second memory bank in accordance with the resultant value of addition of the base address and the offset.

By applying the above approach to the entry addresses of memories and using a partial bit adder to add a part of the base address and a corresponding part of the offset, two relevant entry addresses can be identified. Moreover, access to TLBs can be addressed by providing an even-entry-number memory bank and an odd-entry-number memory bank, each bank including an exclusive partial bit adder, and performing control so that a proper value of carry will be input into each of the partial bit adders in order to gain access to the appropriate memory bank.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 8 shows a truth table of entry addresses;

FIG. 9 shows a truth table of entry addresses;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

First Exemplary Embodiment

Figure 2:
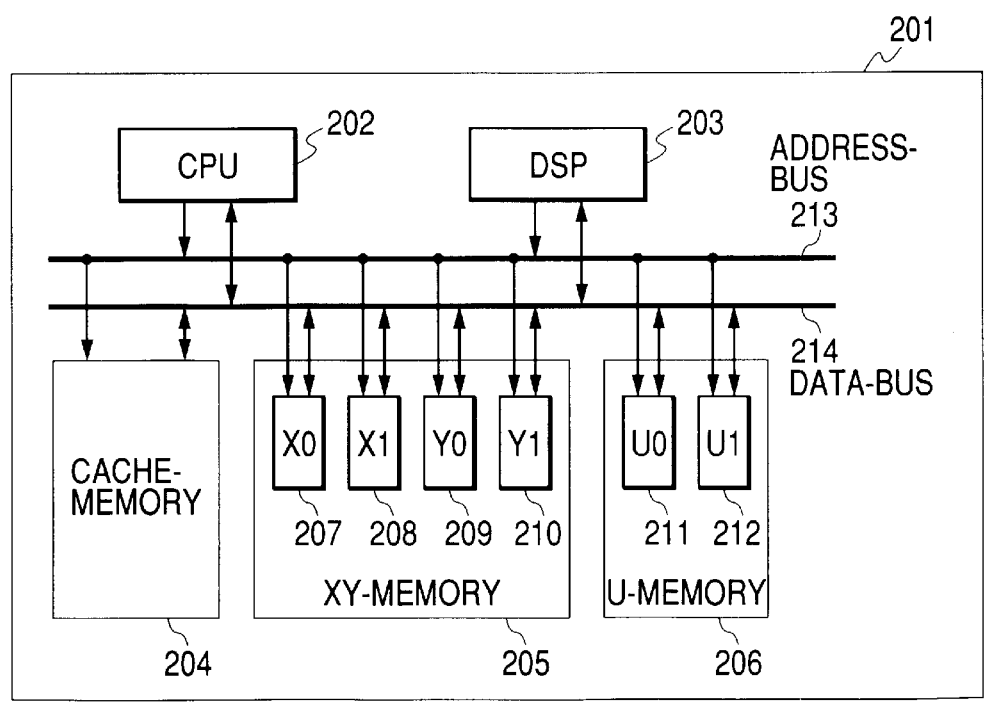
FIG. 2 shows a configuration of memories of a processor according to the present invention.

FIG. 2 shows a configuration of memories of a processor to which the present invention may be applied. The processor 201 has a CPU 202 to perform program control and simple operations and a DSP 203 to process digital signals. The processor 201 also has a cache memory 204 to store a copy of part of the data stored in a main memory, an XY memory 205 to store the operation data of the DSP 203, and a U memory (user memory) 206 to be freely used for user programs. In order to meet a plurality of demands for memory access, the XY memory 205 shown in FIG. 2 consists of four pages: i.e., an X memory page 0 (X0) 207, an X memory page 1 (X1) 208, a Y memory page 0 (Y0) 209, and a Y memory page 1 (Y1) 210. For the same reason, the U memory 206 consists of two pages: i.e., a U memory page 0 (U0) 211 and a U memory page 1 (U1) 212. Access to these memories is accomplished through an address bus 213 and a data bus 214.

Figure 3:
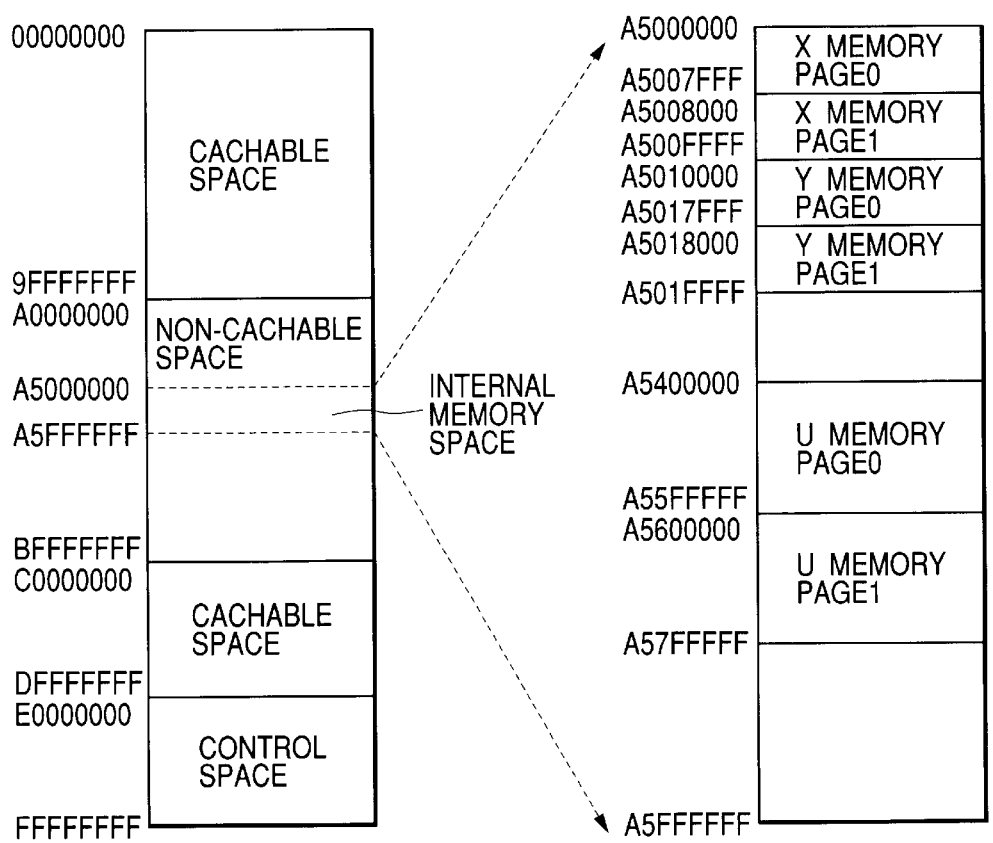
FIG. 3 shows an address map.

As shown in the address map of FIG. 3, the above memories may be arranged in a 32-bit address space, which is divided into cacheable spaces, a non-cacheable space, and a control space. When accessing a cacheable space, cache hit detection is made and proper cache memory control is performed to direct the access to an external memory through the cache memory. When accessing the non-cacheable space, the access is directed directly to the memory designated by the address. The non-cacheable space is further divided into an internal memory space and the other memory space. The X memory pages 0 and 1, the Y memory pages 0 and 1, and the U memory pages 0 and 1 are arranged in the internal memory space. Access to the other memory space is directed to an external memory. Control registers to change the mode of the cache memory and control addresses to read and write directly the tags and data of the cache memory are allocated to the control space.

The different types of memories can be differentiated by addresses; for example, if the address is 60000000, the access is directed to the cache memory; if the address is A5008000, the access is directed to the X memory page 1; if the address is A55FFFF0, the access is directed to the U memory page 0; and if the address is A0000000, the access is directed to an external memory directly.

Figure 4:
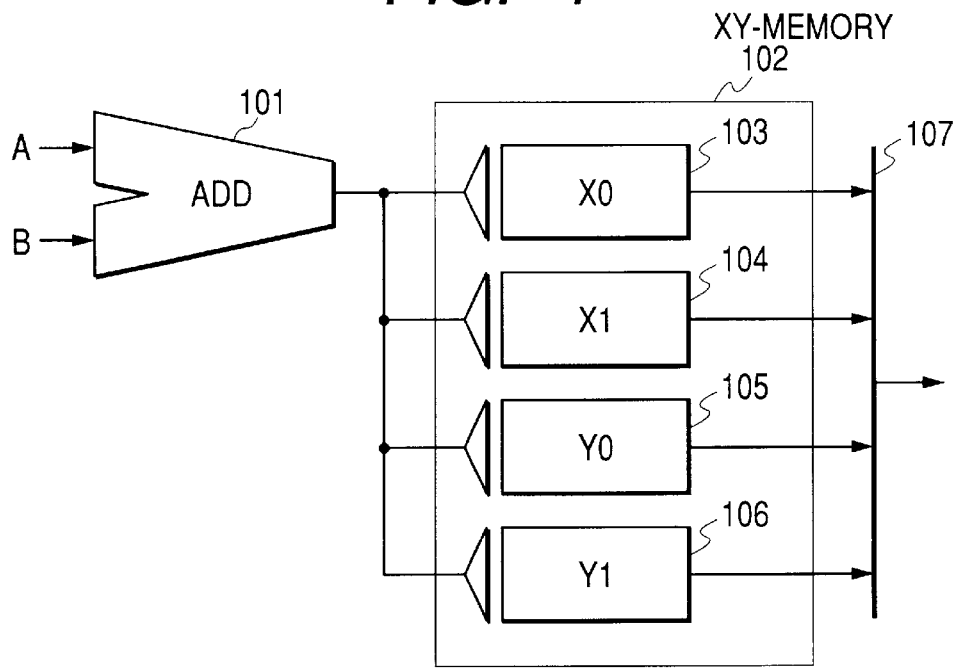
FIG. 4 shows a conventional memory access circuit, which is configured so as to give priority to its processing speed.

FIG. 4 shows the configuration of a conventional memory access circuit to gain access to the XY memory of the memory system of FIG. 2. This memory access circuit is configured so as to give priority to its processing speed. The adder 101 in the memory access circuit generates a memory address by adding an offset B to a base address A. The XY memory 102 consists of four pages: X0 103; X1 104; Y0 105; and Y1 106. The memory access circuit is oriented to enable a high processing speed. Therefore, when access is made to the XY memory, an address is generated and, at the same time, all of the four page memories are immediately operated. A multiplexor 107 chooses the output of one of the four pages 103, 104, 105, 106 and outputs it as the output of the XY memory 102. Accordingly, although no time is wasted in determining which page is being accessed, more electric power is consumed than is necessary because all of the four memory pages are operated.

Figure 5:
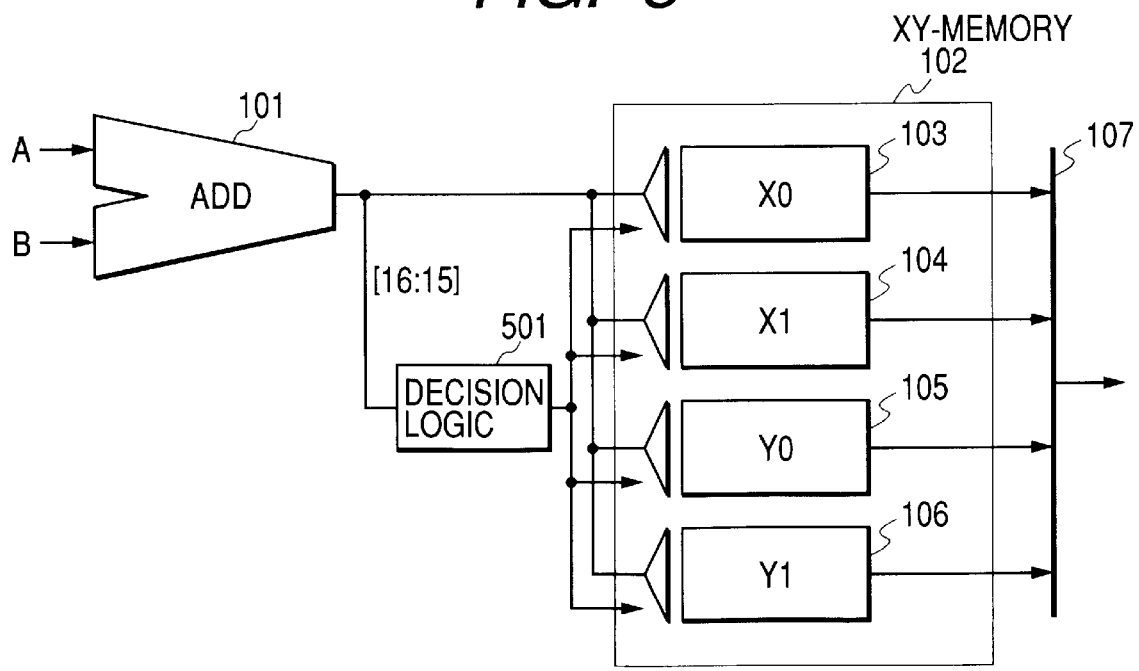
FIG. 5 shows a conventional memory access circuit, which is configured so as to give priority to low power consumption.

FIG. 5 shows a conventional memory access circuit which is configured to give priority to low power consumption. The configuration of this circuit is the same as that of the circuit of FIG. 4 except for a decision logic circuit 501 which is added to reduce power consumption. The decision logic circuit 501 identifies the page of the XY memory to be operated based on bits 16 and 15 of the address generated by the adder 101 and activates only the identified page (rather than activating all pages 103, 104, 105, 106). The identification is made as follows:

Result of addition bits [16:15]→Memory to be operated

| 00 | → | X0 |
| 01 | → | X1 |
| 10 | → | Y0 |
| 11 | → | Y1 |

Accordingly, although the power consumption is reduced, the decision logic circuit adds additional processing time through an adder, decision logic and memory access to increase the memory access time. Because there is a tendency that the upper bits are determined later than lower bits in the adding operation for a memory address, bits 16 and 15 used to identify the relevant memory page are typically determined later than bits 14 to 0 representing the entry address of the XY memory. This adds additional time to the memory access. Because the memory-accessing route from the adder to the decision logic circuit and further to an identified memory is a significant factor in determining the operating speed of the processor (as described above), the delay in this route has significant effects on the performance of the processor.

Figure 1:
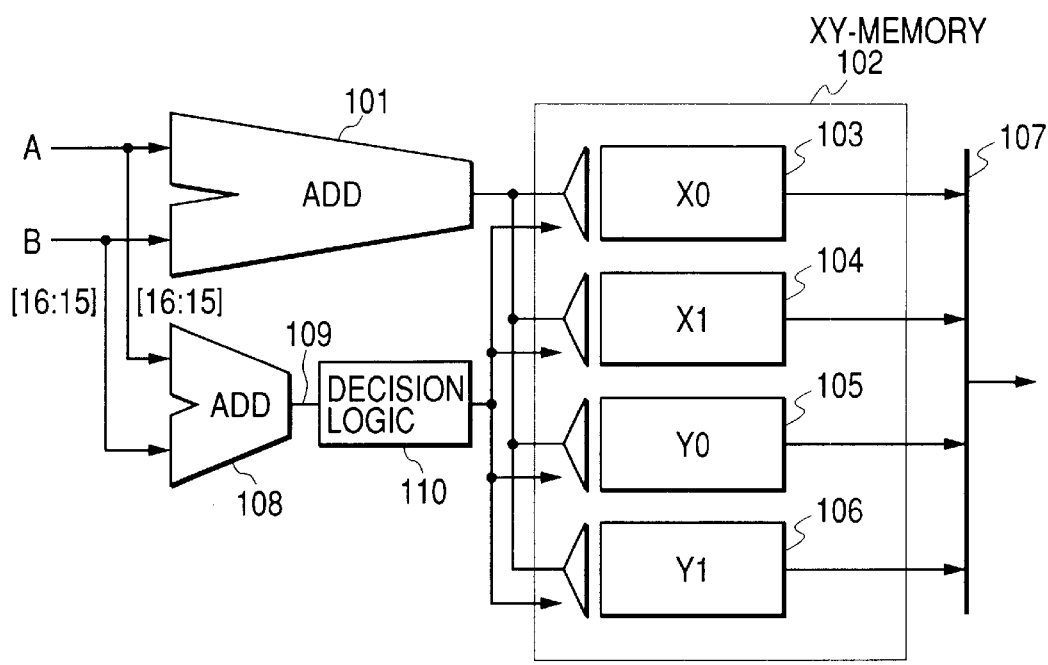
FIG. 1 shows an exemplary memory access circuit according to the present invention.

FIG. 1 shows the configuration of a memory access circuit according to the present invention to gain access to the XY memory of the memory system of FIG. 2. The memory access circuit is characterized by decision logic (or a decision logic circuit) 110 and an exclusive partial bit adder 108. The decision logic 110 of FIG. 1 is different from the conventional decision logic 510 of FIG. 5 (the difference to be described below). The partial bit adder 108 preferably calculates only bits 16 and 15, and are necessary to identify which of the 4 pages or the XY memory is to be operated. The partial bits adder 108 reads A[16:15] and B[16:15] from the base address and the offset respectively, adds the latter to the former, and outputs the result of the addition 109 as 2 bits. As the carry from the second bits is not used to determine the appropriate memory page, the carry does not have to be calculated.

The decision logic 110 determines the page of the XY memory to be operated based on the result of the 2 bit addition 109. In other words, the partial bit adder 108 calculates the second address to identify the memory page to be operated. It should be noted that the carry from the bit 14 to the bit 15 is not included in the result of addition 109. In the present invention, the carry is assumed, and the page identified by adding "1" to the result of addition 109 is also operated. In other words, "1" is added to the second address to find the third address and the memory pages identified by the second and the third addresses are operated. Thus, two of the four pages are preferably activated for each memory access. The identification is made as follows:

Result of partial bit addition→Memory to be operated

| 00 | → | X0, X1 |
| 01 | → | X1, Y0 |
| 10 | → | Y0, Y1 |
| 11 | → | Y1, X0 |

Thus, the memory page that is intended to be accessed is operated without fail, regardless of the result of the addition of bits 14 to 0.

Because the partial bit adder 108 calculates only the bits 16 and 15, the adder operates at a remarkably high speed compared to adder 101 which calculate 32 bits. Additionally, because the decision logic 110 is a simple decoder, the memory page to be operated is identified before bits 14 to 0, representing the entry address of the XY memory, are determined; therefore, the memory access circuit of FIG. 1 operates as quickly as the speed-oriented circuit of FIG. 4.

As described above, by applying the present invention to a memory access circuit to gain access to the XY memory, the circuit's power consumption can be reduced without reducing its operating speed.

Second Exemplary Embodiment

Figure 6:
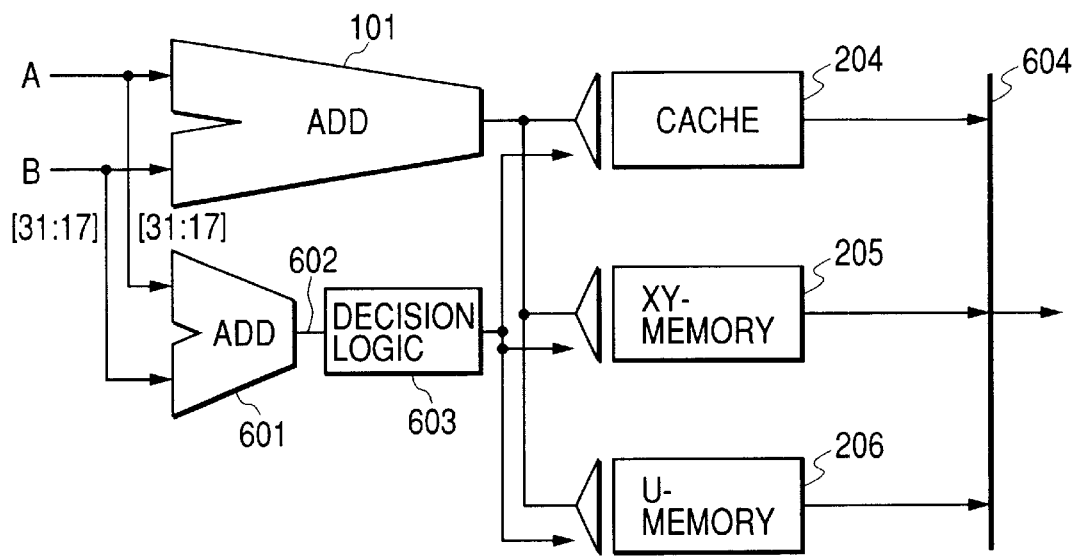
FIG. 6 shows another exemplary memory access circuit according to the present invention.

FIG. 6 shows another memory access circuit according to the present invention to gain access to the memory system of FIG. 2. Specifically, the present invention is applied to the selection of various types of memories. As in the first exemplary embodiment, a partial bit adder 601 and decision logic 603 select from among the cache memory 204, the XY memory 205, and the U memory 206. The address map of FIG. 3 indicates that the partial bit adder 601 has to add B[31:17] to A[31:17] to identify the type of a memory to be operated. The decision logic 603 properly selects and activates a necessary minimum type or types among the three types of memories, taking into account that the carry from bit 16 to bit 17 is not included in the result of addition 602.

Third Exemplary Embodiment

Figure 7:
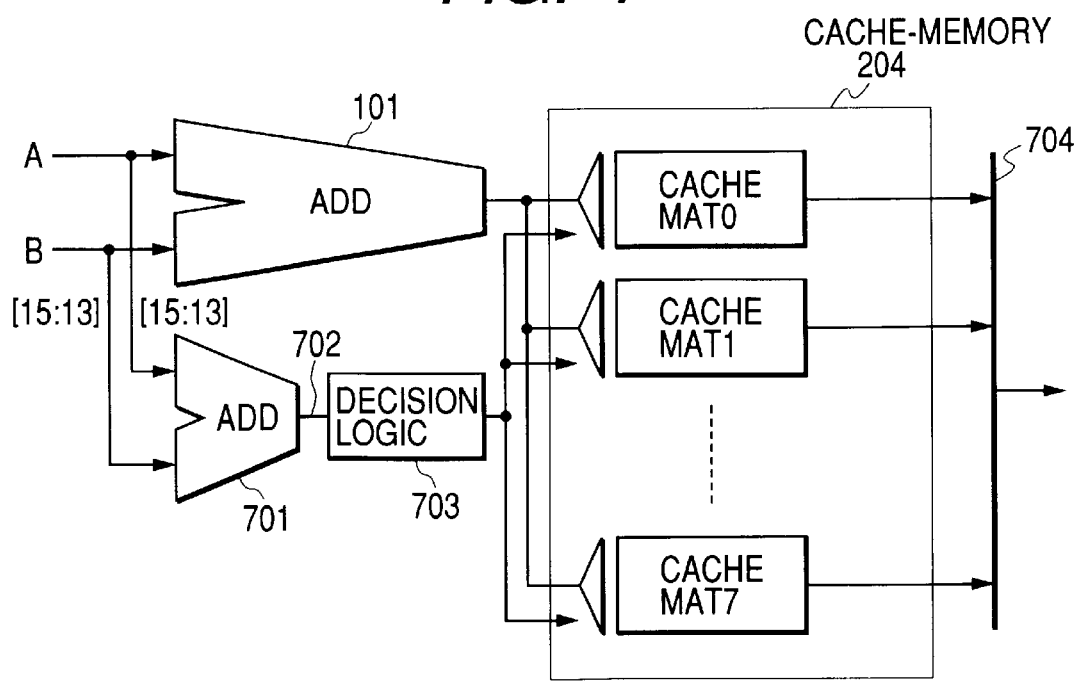
FIG. 7 shows another exemplary memory access circuit according to the present invention.

FIG. 7 shows, as in the first exemplary embodiment, a memory access circuit according to the present invention to gain access to the memory system of FIG. 2. Specifically, the present invention is applied to the choice of memory mats in a cache memory. The cache memory has a capacity of 256 KB, is of a 4-way-set associative system, and has a line size of 32 bits×4 words. The memory's entry address is designated by bits 15 to 4. Because the cache memory is 256 KB in this example, it comprises eight memory mats of 32 KB each in view of yield in production, operating speed, and power consumption.

In this embodiment, the present invention is applied to the choice of memory mats. The choice of memory mats is made based on the data of bits 15 to 13 of a generated memory address. Therefore, the partial bit adder 701 adds B[15:13] to A[15:13]. The decision logic circuit preferably 703 selects two from among the eight memory mats, taking into account that the carry from bit 12 to bit 13 is not included in the result of addition 702. As the memory mat selection can be made before the 32 bit addition 101, the power consumption of the memory access circuit may be reduced without reducing the operating speed of the circuit.

Fourth Exemplary Embodiment

In this embodiment, the present invention is applied to the generation of entries of a translation lookaside buffer (TLB). The processor of this exemplary embodiment has an address space of 32 bits. The page size of the TLB is 1 KB, the number of entries of the TLB is 32, and the TLB is of a 4-way-set associative system. An address space identifier (ASID) can be appointed to reduce the conflict of TLB entries due to a plurality of processes of the operating system (OS). Entry numbers of the TLB are designated by the five bits 16 to 12 of the address and the five bits as the result of converting an ASID with hash functions, which are defined as XOR (exclusive OR) for each bit.

Figure 10:
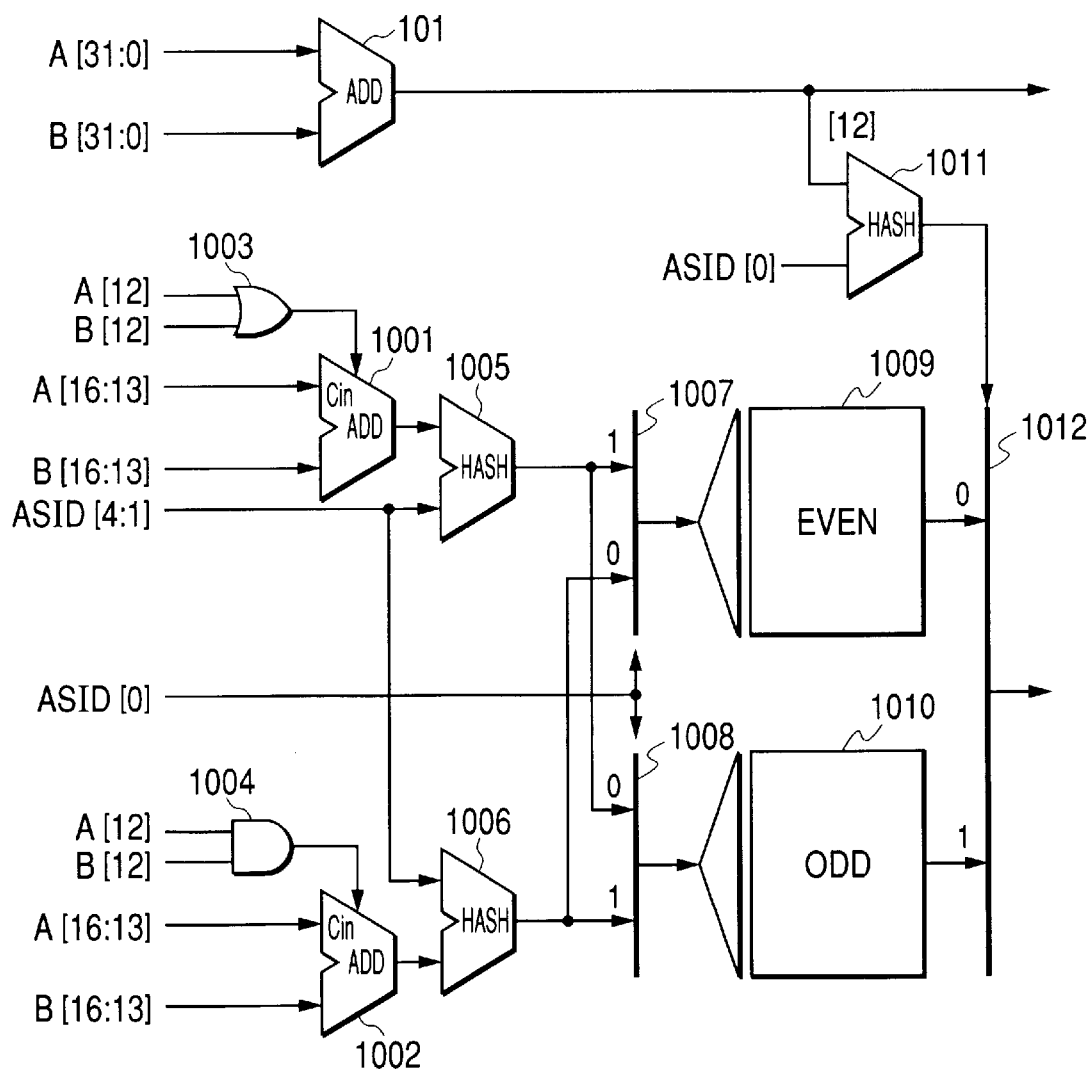
FIG. 10 shows an exemplary TLB translation system according to the present invention.

FIG. 10 shows a TLB access circuit of the processor. The memory is divided into a memory bank of even entry numbers 1009 and a memory bank of odd entry numbers 1010, and each memory bank has address-translation data for 16 entries. One of the two memory banks is chosen by a multiplexor 1012 to become the output of the TLB. Two four-bit adders 1001 and 1002 are provided to calculate entries and the results of these additions are processed by hashers 1005 and 1006, respectively.

A method of calculating entry addresses for the even and odd memory banks will now be described. FIG. 8 shows the relationship among A[12], B[12], carry from lower bits Cin[12], bit 12 of the result of the adder Z[12], carry to bit 12 Cin[12], entry addresses of the even and odd banks, and the multiplexor selection (Bank Select), on the assumption that no hash logic is involved. A line drawn diagonally in a box, in the column of "Even Entry" or "Odd Entry" in the table of FIG. 8 means "don't care" and indicates that the memory bank is not selected by the multiplexor for output.

FIG. 9 is obtained by deleting the columns of Cin[12] and degenerating the table while paying attention to "don't cares." This shows that the entry addresses of even and odd banks can be determined without depending on Cin[12]. It is therefore shown that carry entries Cin of the adder provided in the banks are the logical sum 1003 and the logical product 1004. Further, when examining the relation between Z[12] and the bank in FIG. 8, it can be said that readout results are chosen according to Z[12].

Further, when the hash processing (XOR) is given to the above result, the circuit shown in FIG. 10 is obtained. It should be noted here that there arises a need to exchange the entry addresses of odd and even banks according to ASID[0] by multiplexors 1007, 1008 and further to process the selected signals of the banks by the hash circuit 1011.

Fifth Exemplary Embodiment

Figure 11:
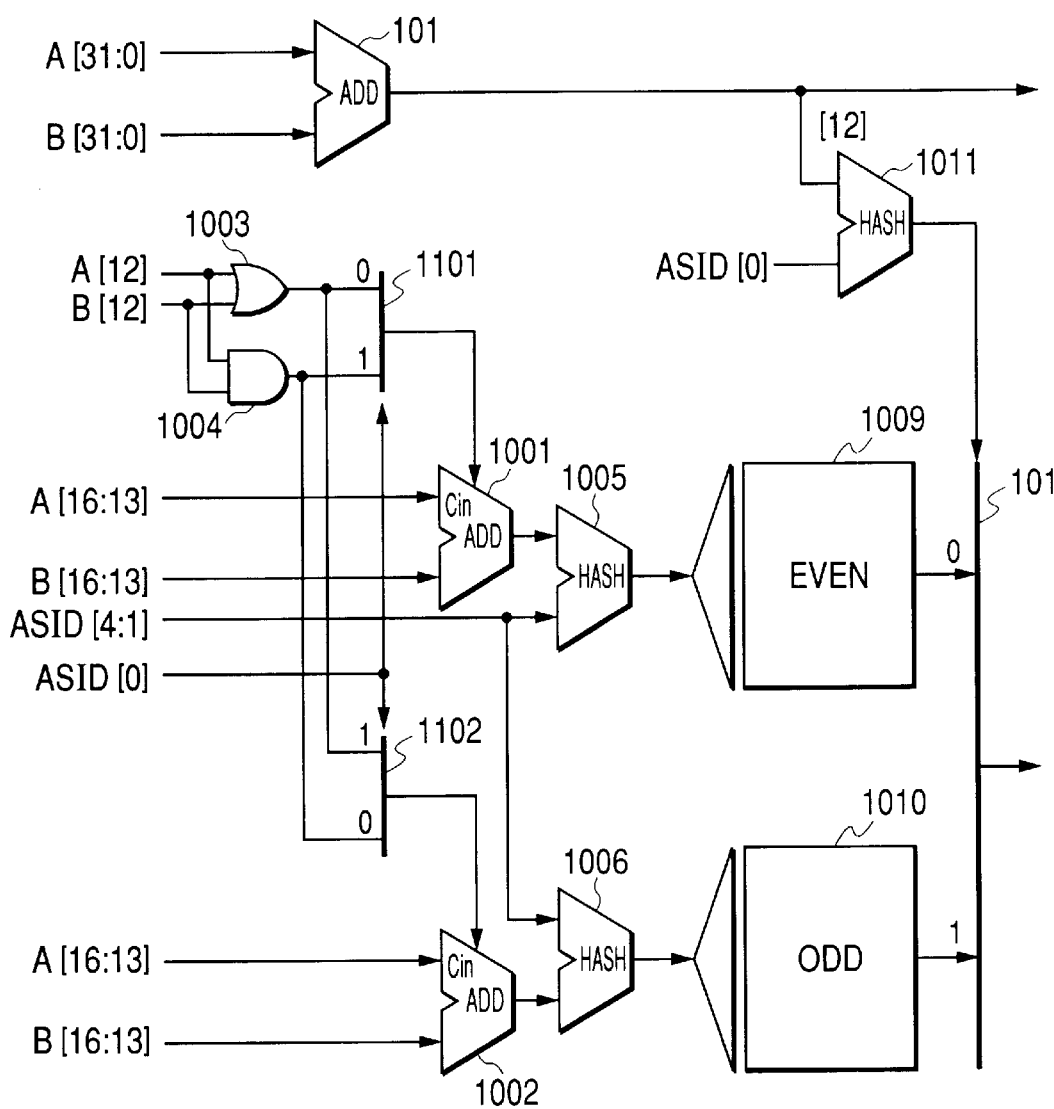
FIG. 11 shows another exemplary TLB translation system according to the present invention.

FIG. 11 shows a circuit wherein multiplexors 1007, 1008 of the entry addresses according to ASID[0] of the TLB access circuit in the fourth exemplary embodiment are replaced with multiplexors 1101, 1102 of Cin of the partial bit adder, and the circuit is logically equivalent to the one in the fourth exemplary embodiment. Compared to the fourth exemplary embodiment, FIG. 11 may be a more suitable configuration for the chip layout in that the entry addresses can be directly connected, without using the multiplexor, to the memory banks.

Sixth Exemplary Embodiment

Figure 12:
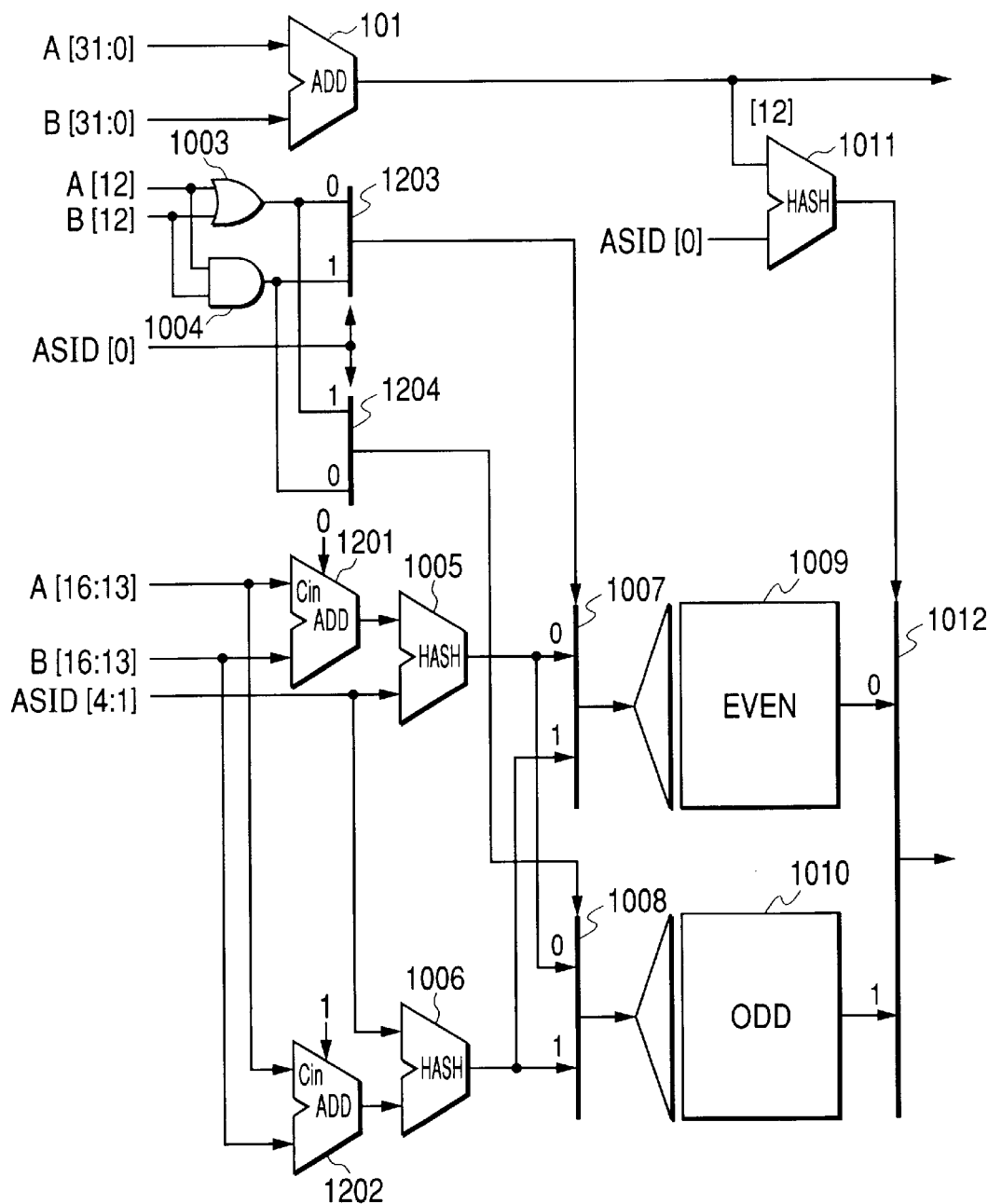
FIG. 12 shows another exemplary TLB translation system according to the present invention.

FIG. 12 shows a circuit wherein Cin of the partial bit adders 1001, 1002 in the TLB access circuit of FIG. 10 is fixed to 0, 1 (1201, 1202), and the logical product and the logical sum of bit 12 are exchanged according to ASID[0] by the multiplexors 1203, 1204. Using this result, entry addresses of the banks are selected, and the above circuit is equivalent logically to the circuit in FIG. 10. Compared to the fourth exemplary embodiment, it is configured so as to give priority to reducing the delay in addition by fixing the Cin of the partial bit adders.

Seventh Exemplary Embodiment

Figure 13:
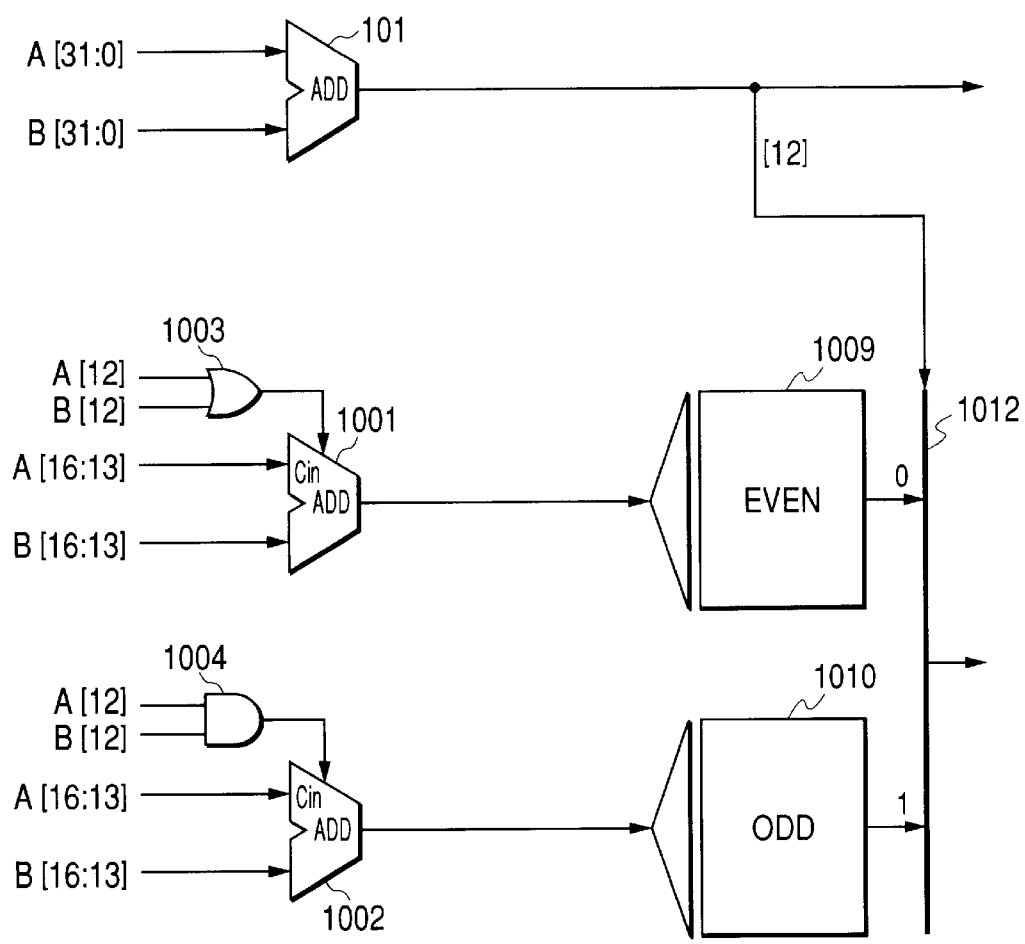
FIG. 13 shows another exemplary TLB translation system according to the present invention.

FIG. 13 shows an example in which no hash processing is conducted in the TLB access circuit of the fourth exemplary embodiment (FIG. 10). The configuration of the present embodiment is also applicable to a cache memory requiring no hash. It is advantageous in that commonly used memories can be utilized for memory banks 1009, 1010, whereas the design disclosed in JP-A-76648/1992 has a special memory configuration capable of reading entry addresses in succession. The present embodiment is advantageous, therefore, in developing a synthesizable processor core.

Eight Exemplary Embodiment

Figure 14:
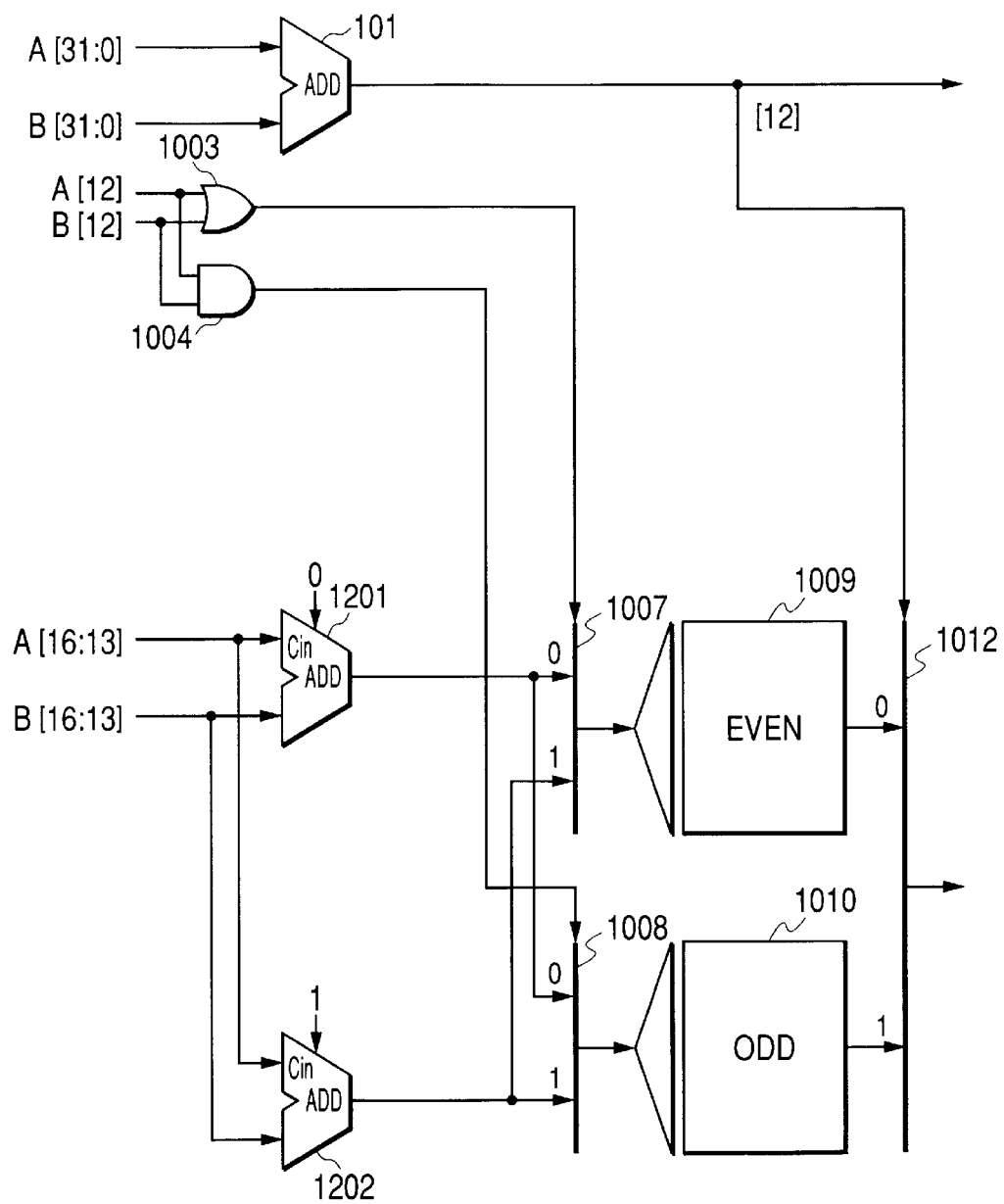
FIG. 14 shows another exemplary TLB translation system according to the present invention.

FIG. 14 shows an example in which the hash processors 1005 and 1006 and the selector circuits 1203 and 1204 of the sixth exemplary embodiment (FIG. 12) are removed. FIG. 14 shows a circuit wherein Cin of the partial bit adders is fixed to 0, 1 (1201, 1202), and the logical product and the logical sum of bit 12 are used to select the entry addresses of the banks (1009, 1010). The results of the partial bit adders 1201, 1202 are fed directly to the banks (without hash processing) via this selection. Compared to the sixth exemplary embodiment, this circuit is configured so as to give priority to reducing the delay in addition by fixing the Cin of the partial bit adders and removing the hash processing and sum/product selection circuit. The present configuration is also applicable to a cache memory requiring no hash.

The invention has thus been shown and described with reference to specific exemplary embodiments. However, it is to be understood that the invention is not limited to the specific embodiments thereof but changes and modifications may be made without departing from the spirit and the scope of the invention. For example, in the first exemplary embodiment shown in FIG. 1, the example described activates two of the four memory pages in advance. However, the specific number of pages is not limited to this. For instance, when the memory consists of 16 pages, any one of the units of 8 pages, 4 pages and 2 pages may be activated in advance. In this case, if the number of pages to be activated in advance is increased, the number of bits needed to calculate the selected addresses decreases, thereby increasing the memory-accessing speed. On the contrary, when the number of pages to be chosen is decreased, power consumption can be reduced. Therefore, the number of pages to be activated in advance is determined by considering the balance of the increase in speed of access and the reduction in power consumption. In general, when the memory consists of N pages (N=$2^i$: "i" is an integer and "^" means to raise to the power of i), the number of pages that can be activated in advance in parallel is any one of the sequence $2^{(i-1)}$, $2^{(i-2)}$, $2^{(i-3)}$, ... $2^2$, $2^1$.

According to the present invention, with the use of some bits of an address obtained by addition, the memory-accessing speed can be increased. This increase in speed is applicable to many circuits related to memory such as the circuits which determine the types of memories, determine the memory mats, and entry addresses required for gaining access to memories.

One of the effects of the present invention is significant in determining types of memories and memory mats at a high speed, which makes it possible, compared to conventional methods, for a data processor to operate at a low power consumption level without reducing its memory-accessing speed.

Another effect of the present invention is significant when applied to the determination of entry addresses. With the effect, it becomes possible to start the operation of the memory earlier than conventional methods and to increase the speed of the process through the memory-accessing route from the adder. Further, another significant effect of this approach is that it can be applied to a TLB and the like of which entry addresses are hash processed.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention.

Accordingly, it is understood that the drawings and the descriptions herein are proffered by way of example only to facilitate comprehension of the invention and should not be construed to limit the scope thereof.

What is claimed is:

1. A data processor, comprising:
    an adder which adds a base address and an offset;
    a memory which has a region divided into a plurality of parts;
    a partial bit adder which adds partial bits of the base address and partial bits of the offset; and
    a decision logic circuit connected to the partial bit adder, wherein the decision logic circuit activates at least two of said plurality of parts of the memory based on the result of addition performed by the partial bit adder, one of said plurality of parts of the memory being selected in accordance with partial bits of an address generated by said addition of the base address and the offset by the adder.

2. A data processor as claimed in claim 1, further comprising:
    a multiplexor which selects one of the outputs from the plurality of parts of the memory.

3. A data processor as claimed in claim 1, wherein said at least two parts of the memory activated by the decision logic circuit is exactly two.

4. A data processor as claimed in claim 3, wherein each of the parts of the region of the memory is in the form of a page.

5. A data processor as claimed in claim 3, wherein each of the parts of the region of the memory is in the form of a memory mat.

6. A data processor as claimed in claim 3, wherein the region of the memory divided into parts includes a cache memory, an XY memory, and a user memory.

7. A data processor as claimed in claim 3, wherein the memory is a cache memory including a plurality of memory mats and said parts of said region of the memory are the memory mats.

8. A data processor as claimed in claim 1, wherein
    said partial bits of the address generated by the addition by the adder are upper bits of the address generated by adding the base address and the offset and constitute a first address,
    the partial bit adder adds upper bits of the base address corresponding to said upper bits of said address which constitutes the first address and upper bits of the offset corresponding to said upper bits of said address which constitutes the first address to generate a second address, and
    the decision logic circuit activates both a part of the region of the memory designated by the second address calculated by the partial bit adder and another part of the region of the memory designated by a third address generated by adding "1" to the second address.

9. A data processor as claimed in claim 8, wherein the partial bit adder calculates the second address without regard to any carry from lower bits which the adder takes into account in calculating the first address.

10. A data processor as claimed in claim 9, wherein the adder, the partial bit adder, the decision logic circuit, the memory, and the multiplexor are integrated on a chip.

11. A data processor as claimed in claim 1, wherein the adder, the partial bit adder, the decision logic circuit, the memory, and the multiplexor are integrated on a chip.

12. A data processor comprising:
    a first partial bit adder which adds a part of a base address, a part of an offset, and the logical sum of said part of the base address and said part of the offset;
    a second partial bit adder which adds a part of a base address, a part of an offset, and the logical product of said part of the base address and said part of the offset;
    a first memory bank connected to the first partial bit adder;
    a second memory bank connected to the second partial bit adder; and
    a multiplexor connected to the first and second memory banks, said multiplexor adapted to select data from the first memory bank or data from the second memory bank based on the resultant value of said addition of the base address and the offset.

13. A data processor as claimed in claim 12, further comprising:
    a first hash circuit which receives and hashes the result of said calculation by the first partial bit adder, and outputs the hash processed result as a first address;
    a second hash circuit which receives and hashes the result of said calculation by the second partial bit adder, and outputs the hash processed result as a second address; and
    a switching circuit adapted to select one of said first and second memory banks, said switching circuit adapted to send the first address to the selected memory bank and send the second address to the other memory bank.

14. A data processor as claimed in claim 13, wherein the first and second partial bit adders, the first and second memory banks, the multiplexor, the first and second hash circuits, and the switching circuit form a circuit to gain access to a translation lookaside buffer.

15. A data processor as claimed in claim 12, wherein the first and second partial bit adders, the first and second memory banks, and the multiplexor are integrated on a chip.

16. A data processor, comprising:
    a first partial bit adder adapted to add a part of a base address and a part of an offset;
    a second partial bit adder adapted to add said part of the base address and said part of the offset;
    a first memory bank to which the results of said addition by the first and second partial bit adders are selectively connected, said selection based on the logical sum of said part of the base address and said part of the offset;

a second memory bank to which the results of said addition by the first and second partial bit adders are selectively connected, said selection based on the logical product of said part of the base address and said part of the offset; and a multiplexor which selectively outputs data from the first memory bank or data from the second memory bank, said selection based on the resultant value of the addition of the base address and the offset.

17. A data processor as claimed in claim 16, further comprising:

a first hash circuit which receives and hashes the result of said calculation by the first partial bit adder, and outputs the hash processed result as a first address;

a second hash circuit which receives and hashes the result of said calculation by the second partial bit adder, and outputs the hash processed result as a second address; and a switching circuit adapted to select one of said first and second memory banks, said switching circuit adapted to send the first address to the selected memory bank and send the second address to the other memory bank.

18. A data processor as claimed in claim 17, wherein the first and second partial bit adders, the first and second memory banks, the multiplexor, the first and second hash circuits, and the switching circuit form a circuit to gain access to a translation lookaside buffer.

19. A data processor as claimed in claim 16, wherein the first and second partial bit adders, the first and second memory banks, and the multiplexor are integrated on a chip.

20. A data processor as claimed in claim 18, wherein the first and second partial bit adders, the first and second memory banks, the first and second hash circuits, the switching circuit, and the multiplexor are integrated on a chip.

* * * * *